Sept. 1, 1970         KARL-FRIEDRICH LEOWALD         3,526,824
CURRENT TRANSFORMER DEVICE FOR HIGH VOLTAGE
Filed Aug. 23, 1967

United States Patent Office 3,526,824
Patented Sept. 1, 1970

3,526,824
CURRENT TRANSFORMER DEVICE FOR HIGH VOLTAGE
Karl-Friedrich Leowald, Erlangen, Germany, assignor to Siemens Aktiengesellschaft, a corporation of Germany
Filed Aug. 23, 1967, Ser. No. 662,694
Claims priority, application Germany, Aug. 27, 1966, S 105,559
Int. Cl. H02m 3/28
U.S. Cl. 321—2                                2 Claims

ABSTRACT OF THE DISCLOSURE

A current rectifier system for high voltage has a number of thyristors series connected in the load circuit. The thyristors are fired simultaneously from respective secondary windings for pulse transformers whose primary winding is constituted by a single loop of a high-voltage cable upon which the iron cores for the secondary windings are placed one beside the other. The cable is connected to a source of direct current through an inverter network which translates the direct current into alternating-current pulses so that each transformer core is alternately magnetized in opposing directions of magnetization. The secondary circuits connected to the firing electrodes of the thyristor comprise rectifier diodes to furnish each time a properly polarized firing pulse.

---

Figure 1:
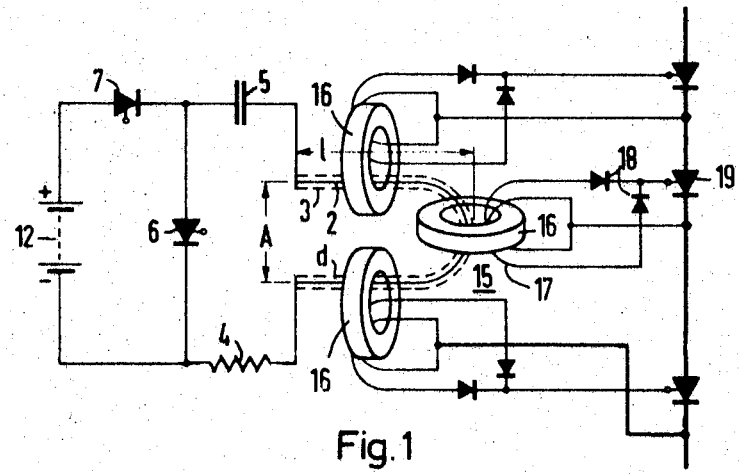

My invention relates to a system for transforming electric current at high voltage, and in a more particular aspect to a current transforming device which incorporates solid state semiconductor components.

It has been proposed to employ thyristors (semiconductor controlled rectifiers) for such purposes of current transformation. Thyristors, however, are sensitive not only to overvoltage and overload current but also to a steep rise of the voltage or load current, or also to a steep rise of the inverse current occurring after turn-off. In equipment for use at high voltages, requiring a relatively large number of thyristors, it is necessary, therefore, to fire all of the thyristors substantially at the same time and in many cases to also effect their turn-off simultaneously, for example in inverter networks with constrained commutation.

It has been proposed to connect the gate or firing electrodes of all series-connected thyristors or respective groups of such thyristors through a common pulse transformer to a direct-voltage source furnishing a gate control voltage for the thyristors. The primary winding of the pulse transformer is constituted by an insulated high-voltage cable equipped with a corresponding number of magnet cores each carrying a secondary winding whose induced current controls one o fthe respective thyristors. The high-voltage cable on which the magnet cores are arranged one beside the other has the shape of a loop. The primary winding of the transformer thus has but a single turn so that its inductivity can be kept correspondingly slight. For pulse transmittal by means of such a single-turn primary, a certain minimum size of the iron cross section is needed for each core.

An additional requirement for a large iron cross section is involved in the control of thyristors appertaining to current rectifying equipment generating with long firing pulses of several millisecond duration. The transmittal of such pulses with the above-mentioned pulse transformer is possible only with a correspondingly large iron cross section of the transformer cores.

With an increasing spacial extent of the transformer cores, however, a sufficient steepness of the frontal flank or leading edge of the secondary pulses and consequently the simultaneous firing of the connected thyristors is no longer assured. Hence the number of thyristors controllable in this manner is limited to a maximum unsatisfactorily small for many purposes.

It is an object of my invention, therefore, to provide a current transforming or rectifying system suitable for high-voltage operation, that affords considerably increasing the number of simultaneously controllable thyristors.

Another object of the invention is to devise a current transforming system, generally of the above-mentioned type equipped with a pulse transformer having magnet cores for controlling a corresponding number of simultaneously operating thyristors, that affords reducing the iron cross section of the magnet cores in comparison with that heretofore necessary for a given number of thyristors.

To achieve these objects and in accordance with my invention, I proceed from the recognition that in systems of the above-mentioned type the iron cross section can be reduced considerably if both directions of magnetization of the iron cores are taken advantage of.

To do this, and in accordance with more specific features of my invention, I provide a current rectifying system for high voltage with a series connection of thyristors which have their respective gate control or firing circuits connected to a direct-voltage source through a pulse transformer whose primary winding is constituted by a high-voltage cable and which has a number of magnetic cores equipped with respective secondary windings, the direct-voltage source serving as a supply of control or firing voltage in this manner. The series connection of such thyristors may also be subdivided into groups of which each is provided with its own pulse transformer of the just-mentioned type. Now, according to my invention, I impress upon the high-voltage cable an alternating current and have the respective secondary windings act upon the thyristor gate electrodes through respective rectifiers. The alternating current is preferably supplied through an inverter which translates direct current into the alternating current needed. The current pulses in the secondary circuit of the pulse transformer correspond to the frequency of the alternating current of the primary winding and are rectified in the secondary circuit and supplied to the control electrode of the connected thyristor. Each time there is formed only a limited sequence of short pulses whose transmittal is possible with the aid of a very slight iron cross section. In such a system, up to fifty secondary windings or more can be arranged on a common core, thus permitting a large number of thyristors to be controlled simultaneously.

Figure 2:
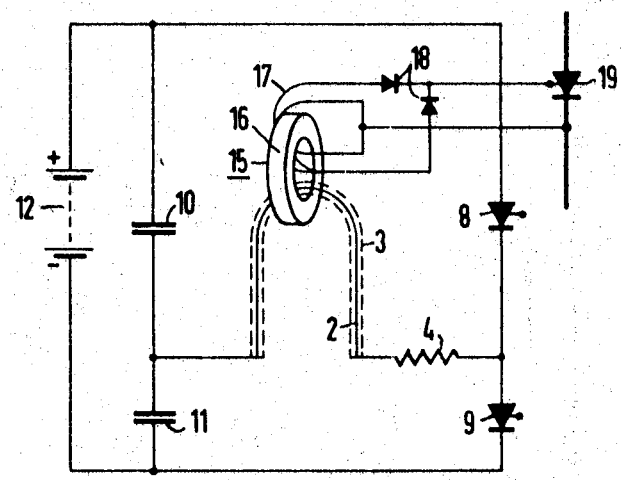

For further explaining the invention, reference will be made to the accompanying drawing, in which:

FIG. 1 illustrates by way of example the circuit diagram of a portion of a current rectifying system according to the invention; and FIG. 2 shows schematically another embodiment.

In FIG. 1 there is schematically shown a cable 2 whose insulation for several 100 kv. is indicated by broken lines. The cable is connected in parallel to a thyristor 6 through a shift capacitor 5 and a current limiting resistor 4. The thyristor 6 is connected in series with a charging thyristor 7 to a direct-voltage source 12 serving as source of control voltage. The firing control cable 2 forms a loop whose length L, for example, is about 400 cm., the spacing A between its legs being approximately 50 cm., or less, for example. The inductivity of the cable loop for the purpose of the invention should not appreciably exceed a few microhenries ($\mu$h.), for example 5 $\mu$h. The cable conductor, therefore, is preferably made of a tube having an outer diameter $d$ of about 3 cm., for example.

A large number of transformers 15 have their annular iron cores 16 placed on the cable 2 one beside the other.

For example, twelve such cores may be placed on the cable, only three of them being shown on the drawing. The transformer core 16 may carry a large number, for example thirty-five, secondary windings 17 formed of a preferably statically shielded conductor. Each of these windings is connected through a rectifier, such as diodes 18 in midpoint connection, in parallel to the firing path (between the gate electrode and the cathode) of a thyristor 19 which is arranged in the main circuit (load circuit) in series with a large number of other thyristors analogously connected other ones of the above-mentioned secondary windings. With the system described, a series connection of 420 thyristors, for example in a current rectifier plant for 400 kv. direct voltage, can be controlled.

When the charging thyristor 7 is being fired, which may be done with any suitable firing circuit of which various configurations are well known, the shift capacitor 5 is charged and the primary winding 2 of the transformers 15 receives a current surge whose intensity is limited by the resistor 4. Corresponding to the winding ratio, a pulse is induced in each of the secondary windings 17 and is supplied through the rectifier diodes 18 to the control electrode of the thyristor 19. The thyristor 7 is turned off as soon as the capacitor 5 is charged. Subsequently, the thyristor 6 is fired and the capacitor 5 discharges through the resistor 4. The resulting primary current pulse of the transformer 15 flows in the reverse direction.

The secondary current is rectified and the control electrode of the thyristor 19 again receives a short pulse having a duration of preferably about 5 to 50 $\mu$sec., especially a pulse of about 20 $\mu$sec. Upon the discharge of capacitor 5, the charging thyristor 7 is again fired and the cycle begins anew. The capacitance of the capacitor 5 in conjunction with the inductivity of the loop of cable 2 as well as the resistance of the resistor 4 determine the duration of the short pulses supplied to the thyristor 19. The number of pulses thus supplied to the gate electrode of thyristor 7 determines in each case the total duration of the pulse sequence.

It will be noted that the network containing the components 4, 5, 6 and 7 operates as an inverter which translates the direct current from source 12 into the alternating current pulses applied to the thyristor 19. The firing of thyristors 6 and 7 may be controlled, for example, by a keyer or clock stage operating at a pulse sequence frequency in the order of 10 kHz., for example. Suitable keying or clock-pulse modules are known and available for data processing and pulse modulating purposes.

In the embodiment shown in FIG. 2, the cable 2 is connected through the resistor 4 to the connecting conductor of a series arrangement of thyristors 8 and 9, on the one hand, and to a connecting line between two storage capacitors 10 and 11, on the other hand. The series connection of thyristors 8, 9 is connected in parallel relation to the series connection of the storage capacitors 10, 11 and in parallel to the control-voltage source 12.

The thyristors 8 and 9 are alternately fired by a keyer or clock stage having a keying frequency of about 10 kHz., for example. Consequently, an alternating current flows through the primary winding of the transformer 15, the oscillation duration of this primary current corresponding to a frequency of about 10 to 25 kHz., for example. The current on the secondary side of the transformer 15 is rectified by the diodes 18 and supplied to the control electrode of the thyristor 19. With a current conducting period of the diodes 18 and consequently a pulse duration of the individual pulses of about 20 $\mu$sec., and with a currentless pause of about 30 $\mu$sec. between the individual pulses, the resulting short pulses have a steepness of more than 2 amp/$\mu$sec. Under these conditions, a large number of thyristors can be fired without dangerous overvoltages. In such a system, all of the primary and secondary pulses have at least approximately the same wave shape.

For simplifying the control, one of the thyristors 8 or 9 may be supplied each time with continuous pulses, whereas the other thyristor receives firing pulses only during the desired period of a pulse chain to be formed.

I claim:

1. A current rectifier system for high voltage, comprising a main circuit having thyristors connected in series with each other, each thyristor having a gate electrode; a pulse transformer having a primary winding formed of a high-voltage cable, a plurality of magnetizable cores on said cable, and secondary windings on each of said cores; rectifier means through which said secondary windings are connected to said respective gate electrodes and an alternating-current pulse source connected to said cable for alternately magnetizing said cores in opposite directions whereby said gate electrodes receive firing pulses due to positive as well as negative pulses applied to said cable, said alternating current pulse source comprising direct current supply means an inverter means connected between said direct current supply means and said cable for translating the direct current into alternating current pulses, said inverter means comprising a capacitor and another thyristor connected in series with each other and jointly in parallel with said cable and a charge control thyristor connected in series with another thyristor across said direct voltage supply means.

2. In a rectifier system according to claim 1, said inverter means comprising a series connection of other thyristors in parallel to said direct-current supply means, said cable having one of its two ends connected to said series connection at a point between said other thyristors; and a series connection of storage capacitors in parallel to said supply means and having a point betwen said storage capacitors connected to said other end of said cable.

References Cited

UNITED STATES PATENTS

| | | |
|---|---|---|
| 3,379,899 | 4/1968 | Chauprade. |
| 3,398,348 | 8/1968 | Kilgore et al. _____ 321—27 X |
| 3,267,290 | 8/1966 | Diebold. |
| 3,398,349 | 8/1968 | Evans et al. _____ 321—27 X |
| 3,409,818 | 11/1968 | Gillett _____ 321—27 |

FOREIGN PATENTS

| | | |
|---|---|---|
| 1,331,827 | 5/1963 | France. |

OTHER REFERENCES

G.E. SCR Manual, 2nd ed., December 1961, pp. 141–142 relied upon.

J D MILLER, Primary Examiner

G. GOLDBERG, Assistant Examiner

U.S. Cl. X.R.

307—240, 252, 262; 321—27